(12) United States Patent
Sandberg et al.

(10) Patent No.: US 11,161,596 B2
(45) Date of Patent: Nov. 2, 2021

(54) CONTROLLING BLADE PITCH BY A PLURALITY OF ELECTRIC MOTORS

(71) Applicant: FLIR Unmanned Aerial Systems AS, Hvalstad (NO)

(72) Inventors: Pal H. Sandberg, Hvalstad (NO); Petter Muren, Nesbru (NO); Trygve F. Marton, Hvalstad (NO); Ivar Johnsrud, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 131 days.

(21) Appl. No.: 16/286,219

(22) Filed: Feb. 26, 2019

(65) Prior Publication Data

US 2019/0193835 A1    Jun. 27, 2019

Related U.S. Application Data

(63) Continuation of application No. PCT/US2017/049786, filed on Aug. 31, 2017.

(30) Foreign Application Priority Data

Aug. 31, 2016  (NO) .................................. 20161380

(51) Int. Cl.
| | |
|---|---|
| *B64C 11/34* | (2006.01) |
| *B64C 11/44* | (2006.01) |
| *B64C 27/68* | (2006.01) |
| *B64C 27/14* | (2006.01) |
| *B64C 11/32* | (2006.01) |

(Continued)

(52) U.S. Cl.
CPC .............. *B64C 11/34* (2013.01); *B64C 11/32* (2013.01); *B64C 11/44* (2013.01); *B64C 27/14* (2013.01); *B64C 27/68* (2013.01); *H02P 5/753* (2013.01); *B63H 3/06* (2013.01); *B64C 2201/024* (2013.01); *B64C 2201/042* (2013.01); *B64C 2201/165* (2013.01)

(58) Field of Classification Search
CPC ......... B64C 11/34; B64C 11/32; B64C 11/44; B64C 27/14; B64C 27/68; B64C 2201/024; B64C 2201/042; B64C 2201/165; H02P 5/753; B63H 3/06
See application file for complete search history.

(56) References Cited

U.S. PATENT DOCUMENTS

| | | | |
|---|---|---|---|
| 2,127,687 A | | 8/1938 | Heath |
| 4,534,524 A | * | 8/1985 | Aldrich .................. B64C 27/58 244/17.25 |

(Continued)

FOREIGN PATENT DOCUMENTS

| | | |
|---|---|---|
| DE | 102004004480 | 6/2006 |
| EP | 0928738 | 7/1999 |

(Continued)

*Primary Examiner* — Igor Kershteyn
*Assistant Examiner* — Joshua R Beebe
(74) *Attorney, Agent, or Firm* — Haynes and Boone, LLP (57) ABSTRACT

The present invention relates to a rotor assembly where associated electric motors are configured to rotate the rotor, control the collective pitch of the rotor/assembly, and/or control the cyclic pitch of the rotor/assembly, by varying the relative rotational angle between two or more of the associated electric motors.

20 Claims, 7 Drawing Sheets

(51) Int. Cl.
*H02P 5/753* (2006.01)
*B63H 3/06* (2006.01)

(56) References Cited

U.S. PATENT DOCUMENTS

| | | | | |
|---|---|---|---|---|
| 4,573,873 A | * | 3/1986 | Yao | B64C 27/59 |
| | | | | 416/114 |
| 4,660,437 A | * | 4/1987 | Scott | B64C 11/32 |
| | | | | 416/152 |
| 5,281,094 A | | 1/1994 | McCarty et al. | |
| 5,282,719 A | * | 2/1994 | McCarty | B64C 11/32 |
| | | | | 416/1 |
| 5,460,487 A | * | 10/1995 | Schmaling | B64C 27/35 |
| | | | | 267/140.2 |
| 8,235,324 B1 | | 8/2012 | Birch et al. | |
| 9,609,288 B1 | * | 3/2017 | Richman | G06K 9/00637 |
| 10,207,800 B2 | * | 2/2019 | Wang | B64C 27/68 |
| 2008/0183341 A1 | | 7/2008 | Neu et al. | |
| 2008/0185476 A1 | | 8/2008 | Suisse et al. | |
| 2015/0142221 A1 | * | 5/2015 | Coulmeau | G08G 5/0034 |
| | | | | 701/3 |
| 2015/0225078 A1 | | 8/2015 | Ries | |
| 2017/0253328 A1 | * | 9/2017 | Wang | B64C 27/68 |

FOREIGN PATENT DOCUMENTS

| | | | | |
|---|---|---|---|---|
| EP | 2028099 | | 2/2009 | |
| EP | 2028099 A1 | * | 2/2009 | B64C 11/44 |
| GB | 293587 | | 7/1928 | |
| GB | 503154 | | 4/1939 | |
| JP | S621690 | | 1/1987 | |
| NO | 20161380 | | 3/2018 | |
| WO | WO 2013/169320 | | 11/2013 | |
| WO | WO-2016020900 A1 | * | 2/2016 | B64C 27/78 |
| WO | WO 2016/116478 | | 7/2016 | |
| WO | WO 2018/045253 | | 3/2018 | |

* cited by examiner

Nominal pitch

Figure 1D2

Collective pitch

Figure 1E1

Nominal pitch

Figure 1E2

Cyclic pitch

Nominal pitch

Figure 2C2

Positive collective pitch

Negative collective pitch

Figure 3B1 — Nominal pitch

Figure 3B2 — Cyclic pitch

CONTROLLING BLADE PITCH BY A PLURALITY OF ELECTRIC MOTORS

CROSS-REFERENCE TO RELATED APPLICATIONS

This application is a continuation of International Patent Application No. PCT/US2017/049786 filed Aug. 31, 2017 and entitled "CONTROLLING BLADE PITCH BY A PLURALITY OF ELECTRIC MOTORS," which is incorporated herein by reference in its entirety.

International Patent Application No. PCT/US2017/049786 filed Aug. 31, 2017 claims priority to and the benefit of Norway Patent Application No. 20161380 filed Aug. 31, 2016 and entitled "CONTROLLING BLADE PITCH BY A PLURALITY OF ELECTRIC MOTORS," which is hereby incorporated by reference in its entirety.

TECHNICAL FIELD

The present invention relates to a rotor assembly for generating thrust and providing collective and/or cyclic pitch by varying the relative rotational angle between two or more associated electric motors.

BACKGROUND

Rotor assemblies may be found in a wide range of vehicles including rotary wing aircraft, UAVs, and fixed wing aircraft that employ one or more rotor assemblies. To maneuver such vehicles, the amount of thrust from a rotor and the direction of the thrust may be changed by adjusting the relative pitch angle of the rotor blades.

In a conventional single-rotor helicopter, the horizontal direction of flight and the stability of the helicopter are controlled by cyclically adjusting the pitch angle of the rotor blades through a so-called swash plate. Cyclically adjusting the pitch angle means that the pitch angle of each rotor blade is adjusted from a maximum in one particular position to a minimum 180 degrees later in the rotation. When the blade pitch alters like this, the initial vertical thrust tilts, rotating the helicopter in the desired direction. By collectively changing the blade pitch of all the rotor blades, i.e. changing the blade pitch of all blades with the same amount, or by simply changing the rotational speed of the rotor, the lift of the rotor assembly may be altered. Multirotor aircraft may maneuver by collectively changing the pitch on one or more rotor assemblies, increasing or decreasing the thrust in the required direction.

A swash plate consists of a rotating disc and a non-rotating disc rotationally connected to each other. Typically, the inner end of each blade is connected to the rotating disc via pitch links, while the control rods are attached to the non-rotating disc. Operating the control rods incline or decline the whole swash plate, or only at desired points. As the rotor rotates, the blade pitch angle of the rotor blades is cyclically adjusted through the rotation as they move over the section inclined or declined by the swash plate control rods. The control rods in a rotary wing aircraft are typically attached to, or constitutes of, servos that operate the movement of the control rods on input signals from the pilot, making the vehicle move in the desired direction.

Alternative rotor assemblies, like the ones found in fixed wing aircraft that adjust the amount of thrust from the rotor by altering the collective pitch, may not include a full swash plate assembly. These instead rely on a more direct connection with e.g. a push rod that adjust the angle of the blade by pushing the rod, or a piston assembly where an increase in hydraulic pressure pushes a piston that again alters the angle.

Regardless, swashplates and servos imply a complicated and heavy rotor assembly that may be slow to react. In light of advances in the electronics industry over the past decades it is desirable to utilize a design that does not rely on the previously mentioned complicated assemblies, swash plates and servos to enable a better performing vehicle.

BRIEF SUMMARY

Embodiments of the present disclosure are directed to overcoming or at least alleviating the above mentioned disadvantages, as set forth by the claims enclosed herein.

According to an embodiment, a thrust generating rotor assembly for a vehicle is disclosed having a first rotor blade adjusted to rotate around a rotor shaft axis with a nominal first blade pitch angle and to pitch around a longitudinal rotor blade axis. The thrust generating rotor assembly may include first and second electric motor units driving the thrust generating rotor assembly. The motor units may be characterized by a first relative rotational angle and be respectively connected to concentrically oriented first and a second rotor shafts able to rotate relative to each other around the rotor shaft axis, where the first rotor shaft runs through the center of the second rotor shaft. The thrust generating rotor assembly may also include a pitch connection between the first and/or the second rotor shaft and the first rotor blade, which may be adjusted or configured to alter the first blade pitch angle in response to altering the first relative rotational angle of the motor units according to a predefined ratio between the first relative rotational angle and the first blade pitch angle depending on the mechanical structure/arrangement of the pitch connection. The thrust generating rotor assembly may also include a motor controller adjusted or configured to control the first relative rotational angle so as to control the first blade pitch angle of the first rotor blade.

In one embodiment of the thrust generating rotor assembly, the first relative rotational angle may be the difference between a first rotational angle of the first motor unit relative to a first nominal angle and a second rotational angle of the second motor unit relative to a second nominal angle. In another embodiment of the thrust generating rotor assembly, the mechanical structure of the pitch connection includes a gear device including a blade gear part connected to the first rotor blade and a shaft gear part connected to the first or the second rotor shaft, where the gear parts are engaged by respective gear teeth. In a further embodiment of the thrust generating rotor assembly, the blade gear part may be connected to the first rotor blade perpendicularly to the longitudinal axis of the rotor blade, and the shaft gear part may be connected to the rotor shafts perpendicularly to the rotor shaft axis. In another embodiment of the thrust generating rotor assembly, the blade gear part may be circularly shaped with a rotational axis coinciding with the longitudinal axis of the rotor blade, and the shaft gear part may be circularly shaped with a rotational axis coinciding with the rotor shaft axis. In a further embodiment of the thrust generating rotor assembly, the pitch connection may be a ball link unit.

In additional embodiments of the thrust generating rotor assembly, the ball link unit comprises a pitch arm with a first end connected through a ball joint to the second shaft and a second end connected through a ball joint to the rotor blade. In another embodiment of the thrust generating rotor assembly, the ball link unit includes a pitch arm with a first end rotationally connected to the first or second shaft, around an axis perpendicular to the rotor axis, and a second end rotationally connected to the rotor blade, around an axis parallel to the longitudinal rotor blade axis.

In additional embodiments of the thrust generating rotor assembly, a second rotor blade may be adjusted or configured to rotate around the rotor shaft axis with a nominal second blade pitch angle and to pitch around the longitudinal rotor blade axis. In related embodiments, the thrust generating rotor assembly may include a third electric motor unit driving the thrust generating rotor assembly and having a second relative rotational angle with respect to the second electric motor unit, the third electric motor being connected to a concentrically oriented third rotor shaft able to rotate relative to the first and second rotor shafts, where the second rotor shaft may run through the center of the third rotor shaft. The thrust generating rotor assembly may also include a pitch connection between the third rotor shaft and the second rotor blade, adjusted or configured to alter the second blade pitch angle in response to altering the second relative rotational angle of the motor units according to a predefined ratio between the second relative rotational angle and the second blade pitch angle depending on a mechanical structure of the pitch connection, where the motor controller may be adjusted or configured to also control the second relative rotational angle so as to control the second blade pitch angle of the second rotor blade.

BRIEF DESCRIPTION OF THE DRAWINGS

FIG. 1D1 illustrates a rotor assembly according to a present embodiment from the side in a nominal position.

FIG. 1D2 illustrates a rotor assembly according to a present embodiment from the side in a collective pitch position.

FIG. 1E1 illustrates a rotor assembly according to a present embodiment from the side in a nominal position.

FIG. 1E2 illustrates a rotor assembly according to a present embodiment from the side in a cyclic pitch position.

FIG. 2C1 illustrates a collective pitch rotor assembly according to a present embodiment from the side in a nominal position.

FIG. 2C2 illustrates a collective pitch rotor assembly according to a present embodiment from the side in a positive collective pitch position.

FIG. 2C3 illustrates a collective pitch rotor assembly according to a present embodiment from the side in a negative collective pitch position.

FIG. 3B1 illustrates a cyclic pitch rotor assembly according to a present embodiment from the side in a nominal position.

FIG. 3B2 illustrates a cyclic pitch rotor assembly according to a present embodiment from the side in a cyclic pitch position.

DETAILED DESCRIPTION

The present disclosure relates to a rotor assembly for generating thrust and controlling collective and/or cyclic pitch by varying the relative rotational angle between two or more associated electric motors. The rotor assembly may comprise one or a plurality of rotor blades. In the following, embodiments of the present disclosure will be discussed and described by referring to the accompanying drawings.

Modern electric motors are capable of fast and precise operation, and may during operation be almost instantly adjusted with very high accuracy. The present invention exploits this by providing an assembly where a number of electric motors provide one or more of the task of: rotating the rotor, controlling collective pitch or controlling cyclic pitch, as to be explained. Note that cyclic pitch in this context refers to repeatedly adjusting the blade pitch at a point in the rotational circle of the rotor to achieve controlled aircraft pitch and roll movements, i.e. in the forward/backward and left/right directions of a horizontally positioned rotary wing aircraft. Collective pitch refers to collectively adjusting the rotor blade angle of associated rotor blades the same amount throughout the rotation to alter the thrust generated by the rotor. Blade pitch in this document refers to tilt movements about the longitudinal axis of a rotor blade.

Figure 1A:
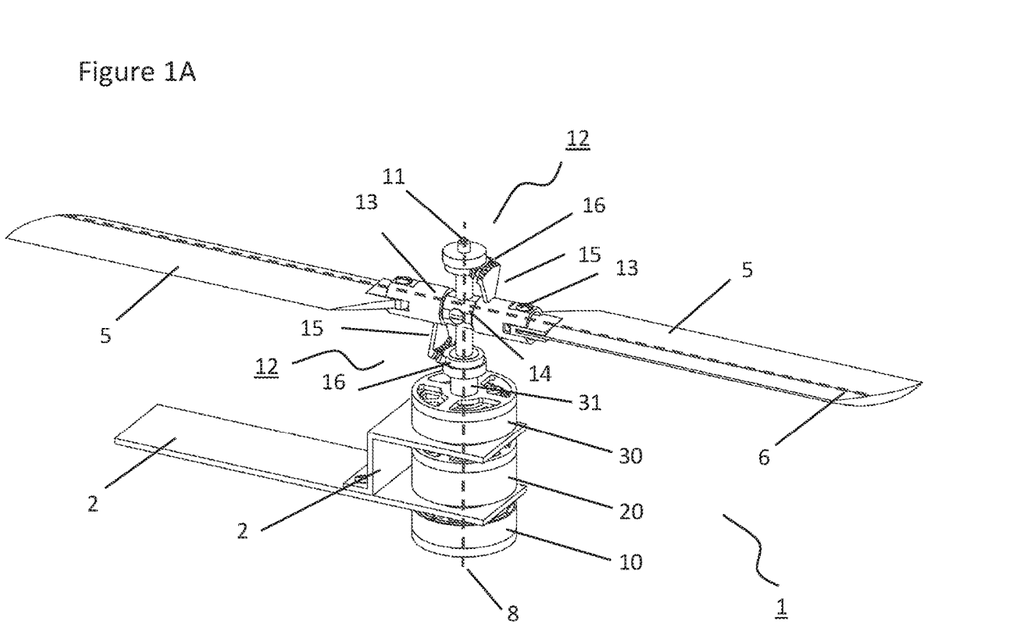
FIG. 1A illustrates a perspective view of a rotor assembly in a stationary position according to one embodiment of the present invention pitch unit comprising a gear assembly.
Figure 1B:
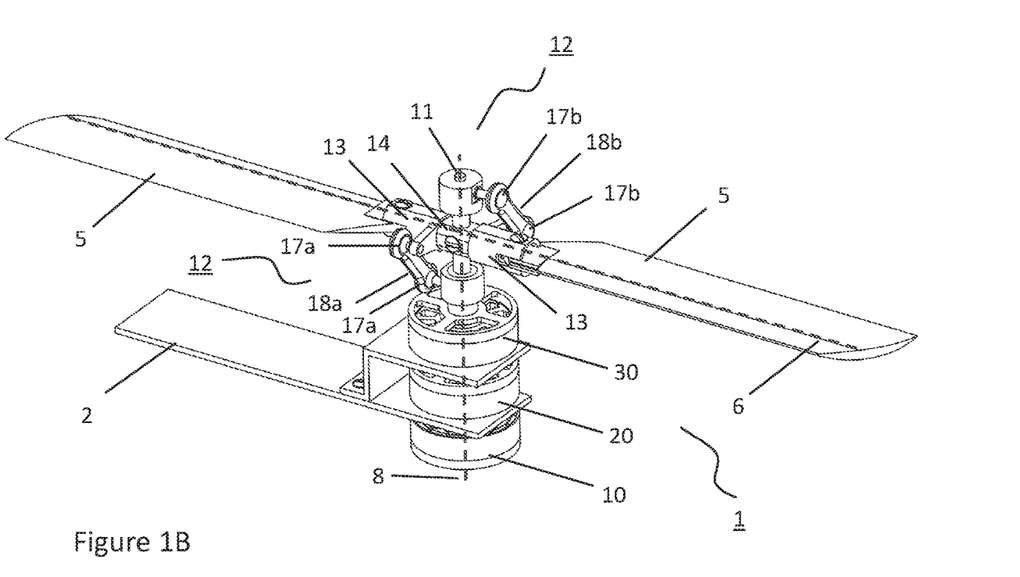
FIG. 1B illustrates a perspective view of a rotor assembly in a stationary position according to another embodiment of the present invention with a pitch unit comprising a ball joint assembly.
Figure 1C:
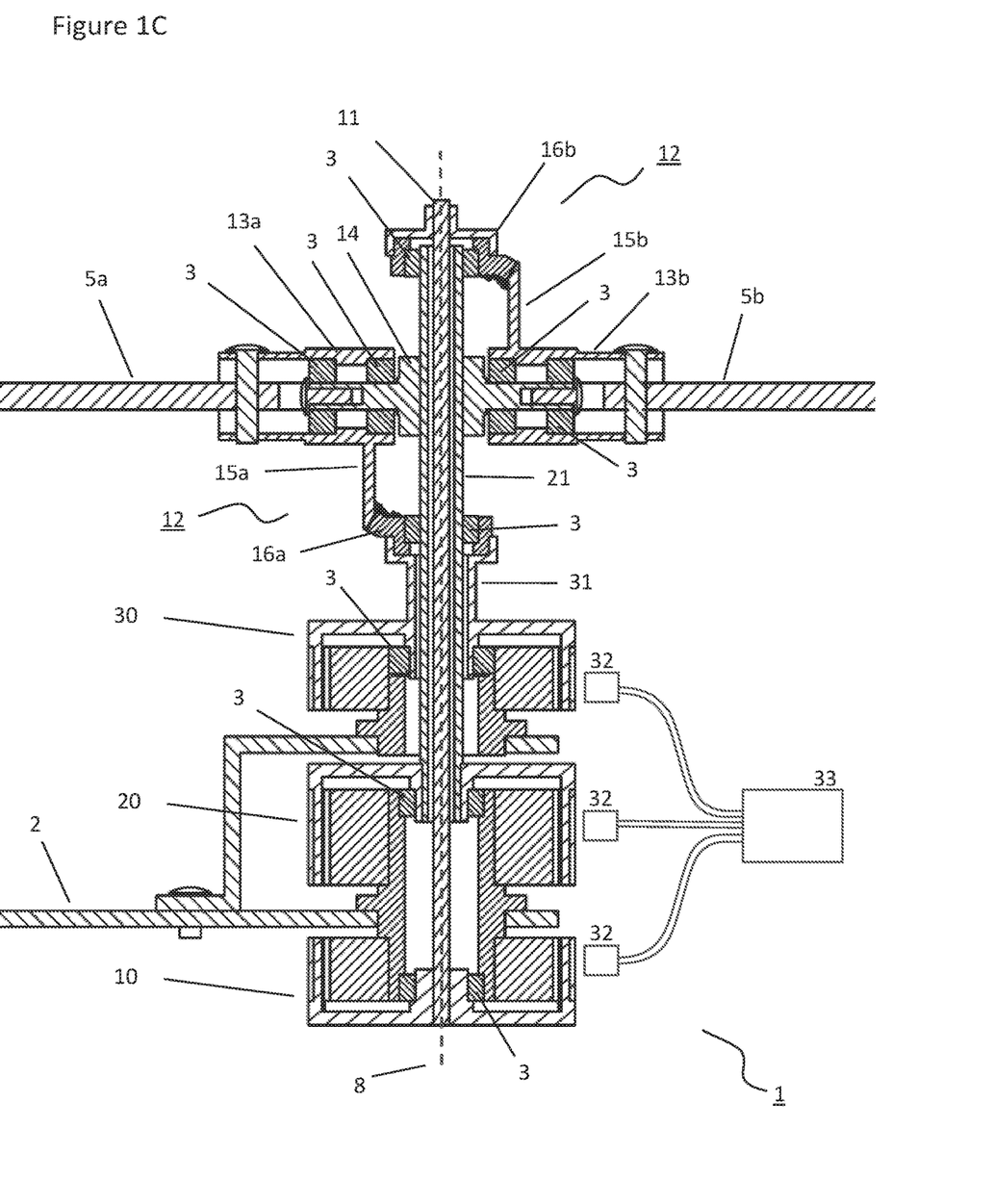
FIG. 1C illustrate a rotor assembly according to a present embodiment comprising a gear assembly in a cross section view.

A first alternative example embodiment of the present disclosure is illustrated in FIGS. 1a and 1c. Here, the rotor assembly includes three motors 10, 20, 30, positioned in a stacked coaxial fashion connected to the vehicle by a motor connection 2. The rotor assembly 1 according to the first alternative embodiment is by virtue of the three motors capable of all three tasks of rotating the rotor and providing collective and cyclic pitch by control from a motor controller 33. The motor connection 2 positions and fastens the rotor assembly 1 to the vehicle, and may take on a number of shape and sizes dependent on the vehicle it is to be positioned in and the size of the motors.

FIG. 1c illustrates a cross-section view of the first example embodiment, where it may be observed that each motor is independently provided relative to each other. Further a rotor shaft 11, 21, 31 is provided and connected for each respective motor, where rotor shaft 11 is positioned within rotor shaft 21, and rotor shaft 21 is positioned within rotor shaft 31. The rotor shafts 11, 21, 31 are further made rotationally independent from each other and may freely rotate around and/or within the other(s), and may be provided with different lengths as required by their position and specific task. A bearing 3 is provided in each connection and transition point with the motor connection 2, with each respective rotor shaft 11, 21, 31, positioning the rotor shafts 11, 21, 31. Further, the rotor shafts 11, 21, 31 rotates about a generally vertical rotor shaft axis 8.

A motor, in this document, also referred to as a motor unit, is in the present defined as a unit providing rotation and torque for operating the rotor assembly 1. Consequently, the motor may be directly connected to the rotor assembly 1, or connected via one or more gears to achieve the same. The alternative embodiments illustrated in FIG. 1-3, elaborated herein below, is adapted to function with an outrunner electric motor unit. In an outrunner electric motor, the "housing" of the motor rotates, while the stator remains stationary. Thereby the stator may be provided with an open center, and the motors may be provided with open centers to accommodate a plurality of rotor shafts running through the center without affecting the independency of each unit. However, the present disclosure may be adapted to function with any type of electric motor provided that the mechanical design allows for transfer of rotational forces to the at least two separate rotor shaft. For example, if the motor unit includes a gear interacting with the corresponding rotor shaft as will be elaborated in relation to FIG. 4. For simplification, the word motor is in present description used throughout.

The position of each respective motor 10, 20, 30 is monitored via a rotational sensor 32. Purely as an example, the rotational sensor 32 could be a magnetic sensor which is adjusted to provide signals representative of the rotational position of the respective motors 10, 20, 30 independently. Alternatively, the rotational sensor 32 could be any kind of position sensor, for example an optic senor, or by performing measurements on the motors backEMF signal. The motor/rotational sensor 32 is connected to a motor controller 33 providing control of the vehicle and driving the respective motors 10, 20, 30. Thus, the motor controller 33 may be further provided with electrical and/or electronic devices and/or mechanisms to receive flight command inputs from a pilot or an autopilot to maneuver the vehicle, to interpret such inputs, and to provide corresponding input/control signals to the respective motors 10, 20, 30, as well as signals from the motor/rotational sensor 32. Alternatively, if the vehicle is fully or semi-autonomous, the motor controller 33 may provide the necessary input/control signals to maneuver the vehicle along a predefined or manually updated route. In a practical implementation, the motor controller 33 and the rotational sensor 32 may be comprised in or integrated with an autopilot unit with additional features and capabilities necessary to operate or autopilot the vehicle. In some cases, the motor controller may be capable of providing supplementary autonomous adjustments to ensure optimal performance of the vehicle in addition to external input from a pilot.

Further, the rotor assembly 1 comprises two generally horizontally mounted and oppositely pointing rotor blades 5 having a predetermined airfoil, set at a predetermined nominal blade pitch angle 7. The rotor blades 5 define a rotor blade axis 6 that extends along a length of the blades 5 from a tip of one blade, e.g. the first rotor blade 5a, to a further tip of the oppositely pointing blade, e.g. the second rotor blade 5b. The position of the rotor blades 5 and the predetermined nominal blade pitch angle 7 are adjusted to provide the required thrust and dynamic stability of the rotor assembly 1 while rotating at a nominal rotational speed.

In another alternative embodiment, stabilizing flybars (not illustrated) may be utilized to counter and balance the properties of the rotor blades 5 to make them dynamically stable during rotation. The generally horizontal stabilizing flybars are typically mounted perpendicular to the rotor blade axis 6 and can take any shape. In other embodiments, specially designed and aerodynamically stable rotor blades, may supplement or substitute for the flybars if dynamic stability is required.

As may be observed in FIG. 1a, the rotor blades 5 are connected to a pitch unit 12, further positioning and centering the rotor blades 5 about the rotor shafts 11, 21, 31, further connected to the motor 10, 20, 30. With further reference to FIG. 1c, the rotor blades 5 are at their base connected to a connecting member 13, comprised in or integrated with the pitch unit 12. One side of the connecting member 13 is adapted to receive and connect to the respective rotor blade 5, and may take any shape that serves the function of connecting the opposing base of a rotor blade 5. An additional fastener, e.g. a screw, bolt, pin, glue or other, may fix the rotor blade 5 to the connecting member 13. Purely as an example, a fastener is illustrated as a screw in the accompanying drawings.

The connecting member 13 may further comprise an arrangement for connecting to a center member 14, positioned in the center of the pitch unit 12. In the example embodiment illustrated in FIG. 1c, this is illustrated as an internal hole, for receiving and connecting to the center member 14. The center member 14 may here comprise a number of arms corresponding to the number of rotor blades 5, for engaging with the connecting member 13 and ultimately the rotor blades 5. A fastener retain the connecting member 13 to the center member 14. The center member 14 is further fixed to the rotor shaft 21 by an additional fastener. One or more bearings 3 may be positioned along the arms of the center member 14, allowing the connecting member 13 to rotate freely about the arms of the center member 14. Thus, the rotor blades 5 may independently rotate and alter their blade pitch 7, but are required to follow any movement of the center member 14 about the rotor shaft axis 8, i.e. rotational movement.

According to the example embodiment, a blade gear 15 is further connected to the connecting member 13. The blade gear 15 is provided as a cog or gear, as for example but not limited to, a bevel gear. The blade gear 15 is further equipped with a predefined diameter, angle and number of teeth corresponding to a shaft gear 16 mounted and connected to the respective rotor shaft 11, 31. The blade gear 15 and the shaft gear 16 is thus provided to transfer an input to alter the blade pitch angle 7 of the rotor blades 5 at a predefined gear ratio, and may thereby also be referred to as the pitch connection. The blade gear 15, a rotor blade 5 and the associated connecting member 13 may according to this embodiment alternatively be produced as one part.

Altering the blade gear 15 and the corresponding shaft gears 16 may consequently provide a mechanism for adjusting the ratio between angular motor movement and blade pitch 7, as well as maximum and minimum blade pitch angle. The design and choice of blade gear 15 and shaft gear 16 may therefore be determined by the operational requirements of the rotor assembly 1 and the level of "resolution" wanted in a blade pitch alteration. For illustrative purposes the shaft gears 16 are according to a first example embodiment provided as a 45-degree section of a gear. This may, however, comprise a complete gear or any smaller or larger part of a full 360-degree gear, dependent on the gear ratio and the required movement necessary to acquire the desired maximum and minimum blade pitch angle 7. The corresponding blade gear 15 is provided as a 22,5-degree section, in this example, with 11,25-degree movement in either direction. The example embodiment illustrated in FIG. 1b, shows a pitch unit 12 with a gear ratio of 2:1, where a 45-degree movement of the shaft gear 16, tilts the corresponding rotor blade 5 with 12,5 degrees in both directions. However, one skilled in the art would appreciate that a number of designs and ratios are feasible and desirable. To provide alternative gear sizes, the shaft gears 16 may be moved down the corresponding rotor shaft, to enable a larger diameter blade gear 15, or up if a smaller diameter blade gear 15 is wanted. Alternatively, the blade gear 15 may be positioned further towards, or away from, the rotor shaft axis 8 to allow for a smaller or larger diameter shaft gear 16. With further addition of a simple casing, the pitch unit 12 may be provided as a closed unit, limiting the possibility of foreign objects interfering with the gear mechanism.

An alternative embodiment of the pitch unit 12 is illustrated in FIG. 1b. Instead of gears, each connecting member 13 is here provided with a ball joint 17 positioned on an arm, replacing the functionality of the blade gear 15. Another ball joint 17 is provided at the connection point with the respective rotor shaft 11, 31, replacing the shaft gear 16. Further, a pitch arm 18 is provided and connected between the two ball joints 17 as a mechanism for translating movements of the rotor shaft 11, 31 to blade pitch movement. Altering the ratio of these movements, may be done by adjusting the length of the arm attaching the ball joints 17 to their respective part, i.e. the connecting member 13 and the rotor shaft 11, 31. With further reference to FIG. 1b, the fastening point of the upper, second, ball joint 17 may not necessarily be in the same plane as the rotor blades 5, as illustrated, but instead be positioned and connected to the pitch arm 18 at an angle, lower or higher relative to a rotor blade plane. Altering the fastening point of the ball joints 17 may in this alternative embodiment further entail increasing or decreasing the length of the pitch arm 18 to achieve the desired angular movement of the rotor blades 5. Likewise, the lower, first, ball joint 17 may also be positioned at alternate angles and positions relative to the rotor shaft axis 8 to achieve the desired movement. A ball joint based pitch unit may in some implementations provide a better durability and easier production than the previously discussed gear based pitch unit 12. The ball joints 17 and the pitch arm 18, may in aggregate also be referred to as a ball link unit, which is thus provided to transfer a provided input to alter the blade pitch angle 7 of the rotor blades 5 at a predefined ratio, and may thereby also be referred to as the pitch connection. For ease of reading, the ball joints 17 in association with the rotor blade 5a may be further referred to as the ball joints 17a where appropriate. Likewise, the ball joints 17 in association with the rotor blade 5b may be further referred to as the ball joints 17b where appropriate.

The motor controller 33 are prior to flight provided with the ratio comprised in the rotor assembly 1, as well as the maximum and minimum blade pitch angle 7 possible with the implemented solution. Regardless of the design of the pitch unit 12, operation and altering the blade pitch angle 7 of the rotor assembly 1 according to the presented claims are identical.

Operation

According to the first example embodiment, the motor 20 is provided as a primary mechanism of rotating the rotor, however, all three motors 10, 20, 30 will contribute to rotation of the rotor assembly 1 by their connection point. Adjusting the rotational speed of the rotor assembly 1 is thereby provided by the motor controller 33, adjusting the speed of the motors 10, 20, 30 up or down at the same rate, monitored by the motor/rotational sensor 32. Further, the motors 10, 20, 30 according to the present disclosure, are provided with a nominal position relative to each other, known to the motor controller 33 and monitored by the motor/rotational sensor 32. By instruction of rotating the rotor by the motor controller 33, the motors 10, 20, 30 will under operation rotate at the same rate and thereby keep their nominal position and rotational angle relative to each other.

In the example embodiment illustrated in FIGS. 1a-1e2, the motor 10 and rotor shaft 11 are by the mentioned arrangement connected and provided as a mechanism for rotating the rotor and providing an alteration in blade pitch angle 7 of the rotor blade 5b. The motor 30 and rotor shaft 31 are by the mentioned arrangement connected and provided as a mechanism for rotating the rotor and providing an alteration in blade pitch angle 7 of the rotor blade 5a. By instruction of applying a change of pitch angle to the rotor blades 5, the motor controller 33 will briefly increase or decrease the speed of the corresponding motor 10, 30, to either retreat or advance the corresponding motor 10, 30 and change the relative rotational angle between the motors 10, 20, 30, thus altering the pitch angle of the desired rotor blade 5. The independency of the motors imply that this may be done on one or both rotor blade 5 simultaneously.

FIG. 1d2 illustrates a positive collective pitch, i.e. increasing the thrust of the rotor assembly 1, compared to a nominal pitch illustrated in FIG. 1d1. To achieve this, the motor 10 is during operation instructed to decrease its rotational angle relative to the motor 20 by a certain amount, corresponding to instruction of movement provided by the motor controller 33, as illustrated by the notch on motor 10. This initiates a corresponding movement of the rotor shaft 11, rotating the rotor shaft 11 with the motor 10 counterclockwise in respect to motor 20. Consequently, the shaft gear 16b and blade gear 15b, alternatively the ball joints 17b and pitch arm 18b, follow the movement, tilting the connecting member 13 about the rotor arms of the center member 14. This increases the blade pitch angle 7 of the rotor blade 5b as a consequence of an altered relative rotational angle between the motor 10 and 20.

Figure 1D:
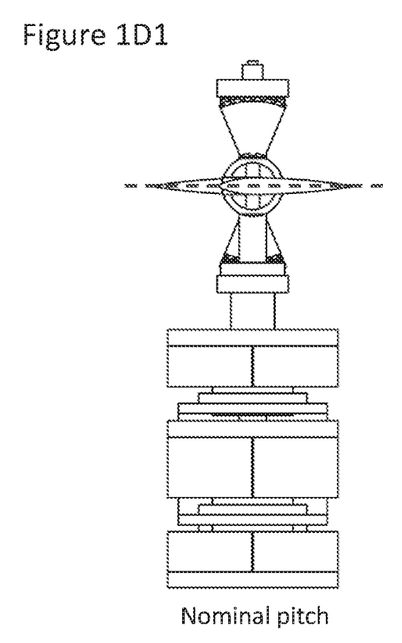
Figure 1D:
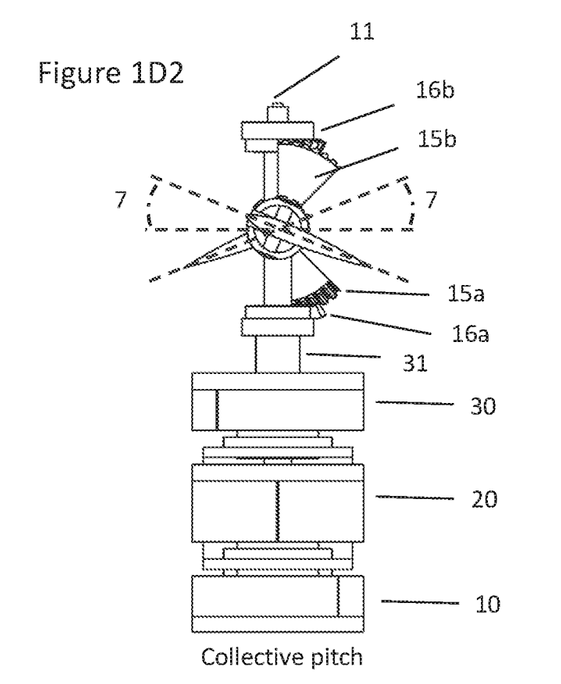
Figure 1E:
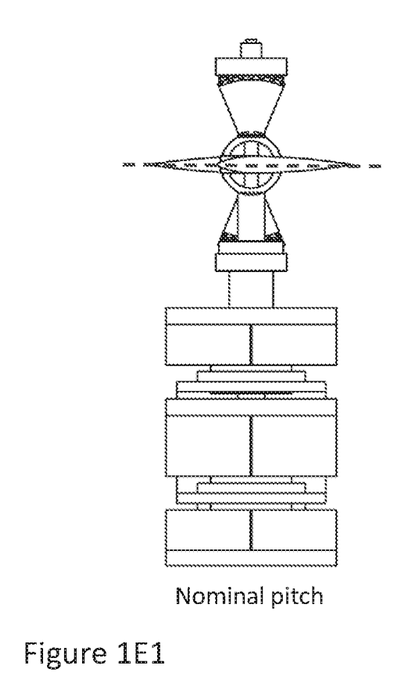

At the same time, the motor controller 33 instruct the motor 30 to increase its relative rotational angle compared to the motor 20. This initiate a corresponding movement of the rotor shaft 31, rotating the rotor shaft 31 clockwise relative to the rotational direction. Consequently, the shaft gear 16a and blade gear 15a, alternatively the ball joints 17a and pitch arm 18a, follow the rotational movement, tilting the connecting member 13 about the rotor arms of the center member 14, increasing the blade pitch angle 7 of rotor blade 5a.

To return to a nominal position, the motor controller 33 simply instruct the motor 10, 30 to return to the known nominal rotational position relative to the motor 20 at the same rate, returning the rotor blades 5a and 5b to their nominal position. Thus, the present embodiment provide an assembly were the relative positional angle between respective motors directly correlate to a blade pitch angle 7 of a rotor assembly 1 at a provided ratio.

With reference to FIGS. 1e1 and 1e2, to provide cyclic pitch, i.e. altering the blade pitch angle 7 of one rotor blade 5 a given amount and the opposing rotor blade 5 with the opposite amount to provide pitch and roll movement of the vehicle, a similar scenario is undertaken. The difference compared to the collective pitch scenario of FIGS. 1d1 and 1d2, however, is that the motors 10, 30 are both instructed to move in the same direction relative to motor 20 to achieve the opposite blade pitch angles 7, as illustrated in FIG. 1e2.

Figure 1E:
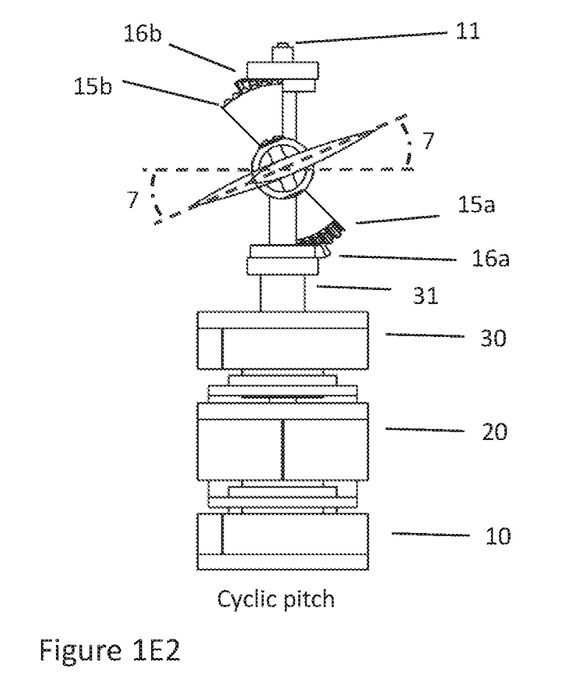

For example, the motor controller 33 instructs the motor 10 to increase its angle relative to the primary motor 20 by a certain amount corresponding to the blade pitch alteration instructed by the motor controller 33. This initiate a corresponding movement of the rotor shaft 11, rotating the rotor shaft 11 clockwise relative to motor 20. Consequently, the shaft gear 16b and blade gear 15b, alternatively the ball joints 17b and pitch arm 18b, follow the movement, tilting the connecting member 13 about the rotor arms of the center member 14, decreasing the blade pitch angle 7 of rotor blade 5b. At the same time, the motor controller 33 also instruct the motor 30 to increase its relative angle compared to the primary motor 20. This initiate a corresponding movement of the rotor shaft 31, rotating the rotor shaft 31 clockwise relative to motor 20. The shaft gear 16a and blade gear 15a, alternatively the ball joints 17a and pitch arm 18a, follow the rotational movement, tilting the connecting member 13 about the rotor arms of the center member 14, increasing the blade pitch angle 7 of rotor blade 5a. This is repeated at the same position in the rotational circle over several rotations of the rotor assembly 1 to provide a sustained aircraft or vehicle pitch or roll movement in a given direction.

Further, to be able to apply the cyclic changes correctly, the motor controller 33 should know the position of the rotor blades 5 as the rotor assembly 1 rotates. Since the parts that connects the motor to the rotor blades 5 may be considered as stiff, this is done by virtue of the rotational sensor 32. Purely as an example, the rotational sensor 32 can register every time a certain position of the motors 10, 20, 30 passes the sensor. Further, by monitoring the time between when the rotational sensor 32 registers a revolution, the motor controller 33 can calculate a precise position of a rotor blade 5 throughout the next revolution. When the motor controller 33 combines the input from the rotational sensor 32 with the calculated position of the rotor blades 5, it knows exactly when to apply a cyclic pitch input, and the amount of change necessary to control the vehicle.

Depending on the rotational speed, the rotational moments of inertia and the properties of the rotor assembly 1, the change in relative angle between the motors 10, 20, 30, both during cyclic and collective pitch, may preferably be applied some time before a change in blade pitch angle 7 is required to take effect. The exact advance in time may be determined through calculations, simulations or through practical tests with a fully functional rotor and control system. The necessary advance in input to account for this factors is controlled by the motor controller 33.

Alternative Embodiments

Collective Pitch Rotor Assembly

In multirotor vehicles of all types and sizes, like for example quadcopters, maneuvering is typically done by adjusting the thrust of associated rotor assemblies, most commonly by adjusting the rotational speed of the rotor assemblies. Adjusting the thrust of all rotors equally may maneuver the vehicle in a vertical direction, while a difference in thrust between the multiple rotor assemblies are utilized to achieve pitch, roll and yaw movements. Inclusion of a fast and precise collective pitch assembly may further enhance the maneuverability and capabilities of multirotor vehicles. This also apply for fixed wing aircraft, underwater ROVs and other vehicles that vary the thrust of a rotor assembly to alter the speed or maneuver the vehicle in a given direction.

Figure 2A:
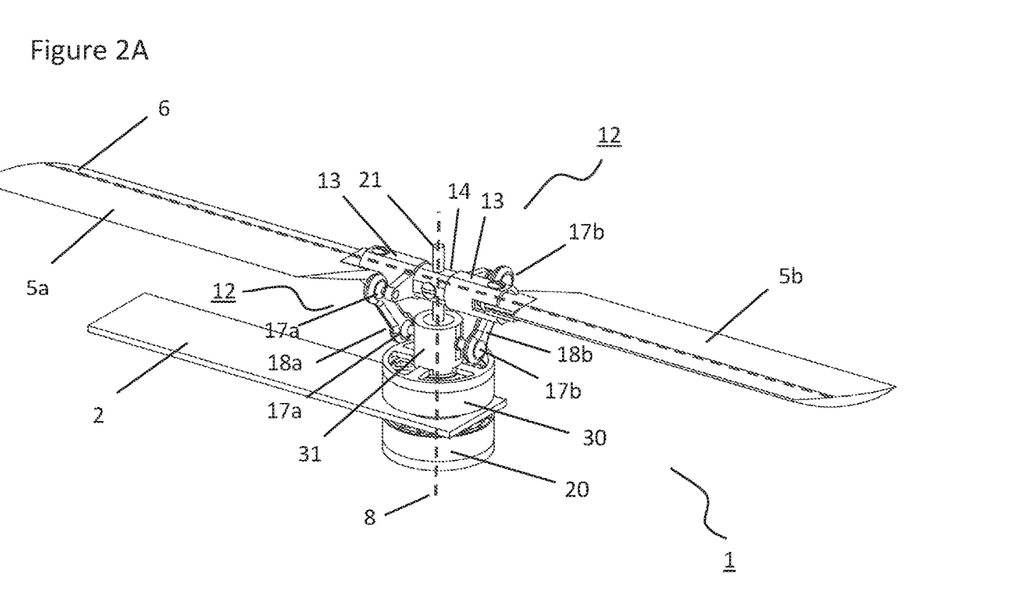
FIG. 2A illustrates a perspective view of a collective pitch rotor assembly in a stationary position according to one embodiment of the present invention comprising a ball link unit.

A first alternative embodiment is illustrated in FIG. 2a. According to this embodiment the rotor assembly 1 is adjusted to provide the tasks of rotating the rotor and providing collective pitch as controlled by the motor controller 33 i.e. to alter the thrust of the rotor. The present embodiment to be presented therefore entail two motors 20, 30 corresponding to two tasks, however the remaining structure is principally similar to the previously presented rotor assembly 1 capable of all three.

Thereby, FIG. 2a illustrates an example embodiment of a collective pitch rotor assembly 1 with two motors 20, 30 positioned and independently provided in a stacked coaxial fashion connected to the vehicle by a motor connection 2. The position of each respective motor 20, 30 is monitored via a rotational sensor 32. The motor controller 33 is further provided with electrical and/or electronic devices and/or mechanisms to receive flight command inputs from a pilot or an autopilot (not illustrated) and provide the necessary input to drive the respective motors 20, 30, operate the rotor assembly, and maneuver the vehicle. Further, two rotor shafts 21, 31, are connected to the motors 20, 30, where the rotor shaft 21 is adapted to run within rotor shaft 31.

The rotor assembly 1 as shown in FIG. 2a comprises two generally horizontally mounted and oppositely pointing rotor blades 5 having a predetermined airfoil, set at a predetermined nominal blade pitch angle 7. The rotor assembly 1 according to this example embodiment may, however, comprise only one or a plurality of rotor blades 5. Regardless, the rotor blades 5 are in their base connected to a pitch unit 12, further positioning and centering the rotor blades 5 about the rotor shafts 21, 31 further connected to the motor 20, 30. Each rotor blade 5 is at its base connected to a connecting member 13, comprised in the pitch unit 12. An additional fastener may retain the rotor blades 5 to the respective connecting member 13. A center member 14 is further retained to the rotor shaft 21 by an additional fastener. By a number of bearings 3 positioned along the arms of the center member 14, each connecting member 13 is positioned and allowed to rotate freely about the arms of the center member 14. Thus, the rotor blades 5 may rotate and alter their blade pitch angle 7, but are required to follow any movement of the center member 14 about the rotor shaft axis 8, i.e. rotational movement.

A ball joint 17 is provided in relation with, and connected to, each connecting member 13. Another ball joint 17 is provided for each rotor blade 5 and connected to the rotor shaft 31. Further, a pitch arm 18 is provided and connected between the two ball joints 17 as a mechanism for translating rotational movements of the rotor shaft 31 into blade pitch movement of the rotor blades 5 at the same time and at the same rate. Still referring to FIG. 2a, the motor 20 is provided as a primary mechanism of rotating the rotor, however, both motors 20, 30 will contribute to rotation of the rotor assembly 1 by their connection point. Altering the rotational speed of the rotor assembly 1 is thereby provided by the motor controller 33, driving the motors 20, 30. To initiate a change in blade pitch angle 7 of the rotor blades 5, the motor controller 33 will briefly increase or decrease the speed of the corresponding motors 20 and 30, to either retreat or advance motor 30 with respect to motor 20 to change the relative rotational angle between the motors 20, 30. Thus, providing an assembly were the relative positional angle between respective motors directly correlate to a collective blade pitch angle 7 of a rotor assembly 1 at a provided ratio.

With reference to FIG. 2c1-2c3, to provide an increased blade pitch angle 7 collectively, the motor controller 33 during rotation instruct the necessary alteration in relative rotational angle between the respective motors 20, 30 as illustrated with the notch on motor 30. A difference in rotational angle between the motors 20, 30 consequently rotates the rotor shaft 31 relative to the rotor shaft 21. As both rotor blades 5 is connected to the rotor shaft 31 via the pitch unit 12, an alteration in relative rotational angle between the motor 20 and 30 will through the pitch arms 18 translate to an altered angle of both rotor blades 5 simultaneously.

For example, under operation, the motor 30 is instructed to increase its angle relative to the motor 20 by a certain amount corresponding to instruction of increased thrust provided by the motor controller 33, i.e. positive collective pitch. This initiate a corresponding movement of the rotor shaft 31, rotating the rotor shaft 31 clockwise relative to the rotational direction. Consequently, the ball joints 17 and pitch arm 18, follow the movement, rotating the connecting member 13 associated with each rotor blade 5 about the rotor arms of the center member 14, increasing the blade pitch angle 7 of the rotor blades 5. If a negative collective pitch is needed, the opposite will take place.

Figure 2B:
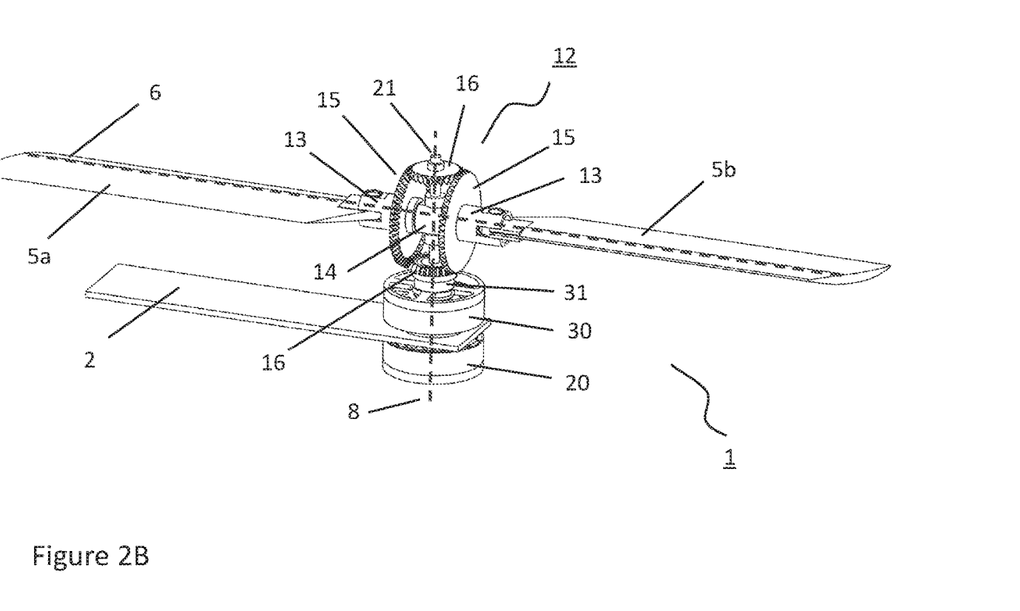
FIG. 2B illustrates a perspective view of a collective pitch rotor assembly in a stationary position according to one embodiment of the present invention comprising a differential gear assembly.
Figure 2C:
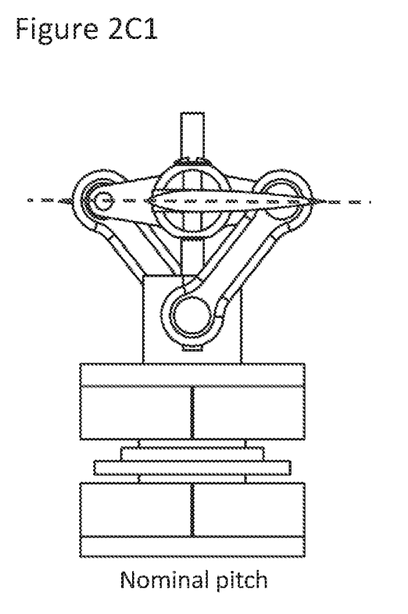
Figure 2C:
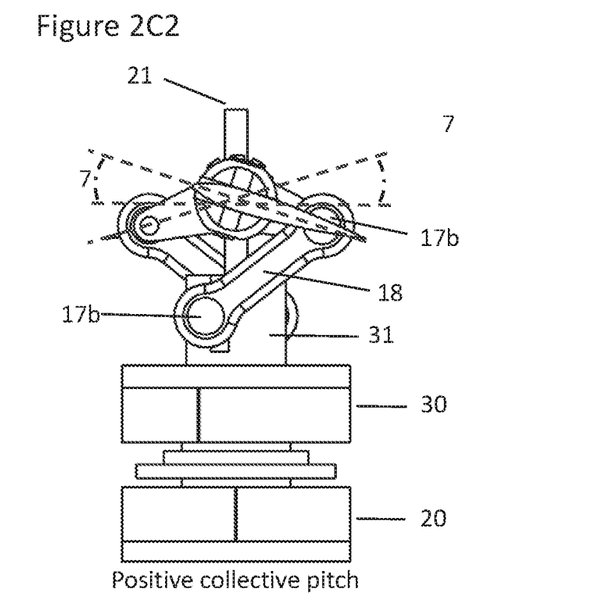
Figure 2C:
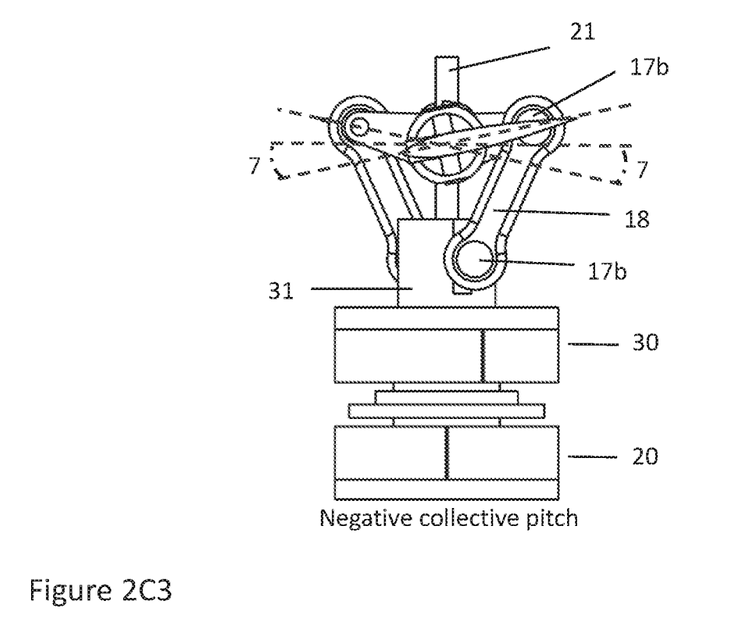

Alternatively, this example embodiment may include a gear system similar to what previously described, and as illustrated in FIG. 2b. As may be observed, the pitch unit 12 of this alternative embodiment may actually be considered as a mechanical differential, translating input movements from the motors 20, 30 around one axis into a blade pitch movement around the rotor blade axis 6 at a given ratio. Further, the center member 14 of this alternative embodiment is adapted to freely rotate about the rotor shaft 21 as the connection points here is between the gears 15, 16. This alternative embodiment divides the load of operating the rotor blades 5 evenly between the two motors 20, 30, both in regards to rotating the assembly and altering the blade pitch angle 7.

Cyclic Pitch Rotor Assembly

Figure 3A:
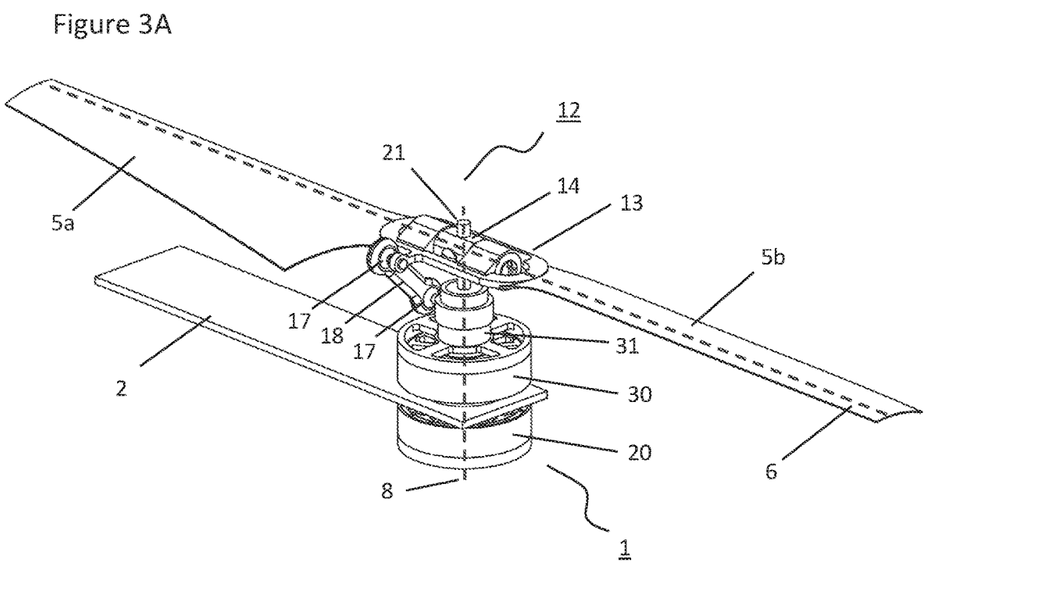
FIG. 3A illustrates a perspective view of a cyclic pitch rotor assembly in a stationary position according to one embodiment of the present invention.

A second alternative embodiment is illustrated in FIG. 3a. Rotor wing aircraft may utilize a cyclic pitch rotor assembly 1 to provide pitch and roll movements, while altering the thrust may be done by adjusting the rotational speed of the rotor. According to this embodiment the rotor assembly 1 is adjusted to provide the tasks of rotating the rotor assembly 1 and controlling cyclic pitch by control from the motor controller 33. As with the previous alternative embodiment disclosing a collective pitch rotor assembly 1, this is here illustrated with a ball joint based pitch unit 12, however, this example embodiment may include a gear system similar to what previously described under the first alternative embodiment without this affecting the functionality of the embodiment.

The example embodiment illustrated in FIG. 3a, discloses a cyclic pitch rotor assembly 1 with two motors 20, 30 positioned and independently provided in a stacked coaxial fashion connected to the vehicle by a motor connection 2. The position of each respective motor 20, 30 is monitored via a rotational sensor 32. The motor controller 33 is further provided with electrical and/or electronic devices and/or mechanisms to receive flight command inputs from a pilot or an autopilot (not illustrated) and provide the necessary control to drive the respective motors 20, 30, operate the rotor assembly, and maneuver the aircraft. Further, two rotor shafts 21, 31, are connected to the motors 20, 30, where the rotor shaft 21 is adapted to run within rotor shaft 31.

The rotor assembly 1 comprises two generally horizontally mounted and oppositely pointing rotor blades 5 having a predetermined airfoil, set at a predetermined nominal blade pitch angle 7. The rotor blades 5 are in their base connected to a pitch unit 12, further positioning and centering the rotor blades 5 about the rotor shafts 21, 31 further connected to the motor 20, 30. For optimal effect, a cyclic pitch rotor may preferably require the two rotor blades to take oppositely oriented blade pitch angles 7 at the same time. Therefore, the example embodiment illustrated in FIG. 3a, shows the rotor blades 5 and connecting member 13 manufactured as one combined and rigid unit.

The center member 14 is further fixed to the rotor shaft 21 by an additional fastener. By a number of bearings 3 positioned along the rotor blade arms of the center member 14, the combined unit is positioned and allowed to rotate freely about the arms of the center member 14. Thus, the rotor blades 5 may rotate and alter their blade pitch 7, but is required to follow any movement of the center member 14 about the rotor shaft axis 8, i.e. rotational movement. A ball joint 17 is provided in relation to the connecting member 13 of the rotor blade 5a. Another ball joint 17 is provided and connected in relation to the rotor shaft 31. Further, a pitch arm 18 is provided and connected between the two ball joints 17 as a mechanism for translating movements of the rotor shaft 31 to blade pitch movement of the rotor blade 5a. Since the rotor blades 5 are required to be oppositely pointing, increasing or decreasing the blade pitch 7 of the rotor blade 5a of the combined unit will require the opposite to take place on the opposing rotor blade 5b. This provide a maximum thrust at one rotor blade 5 at a point in the rotational circle, and a minimum at the other. The cyclic pitch movement will typically follow a sinus function.

According to this alternative embodiment, the motor 20 is provided as a primary mechanism for rotating the rotor, however, both motors 20, 30 will contribute to rotation of the rotor assembly 1 by their connection point. Altering the rotational speed of the rotor assembly 1 is thereby provided by the motor controller 33, controlling the motors 20, 30 to alter their speed up or down at the same rate, monitored by the motor/rotational sensor 32.

Figure 3B:
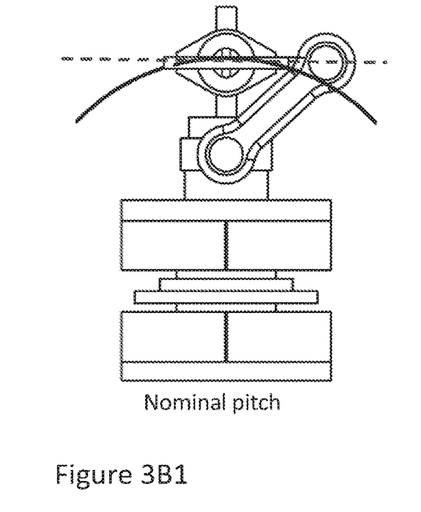
Figure 3B:
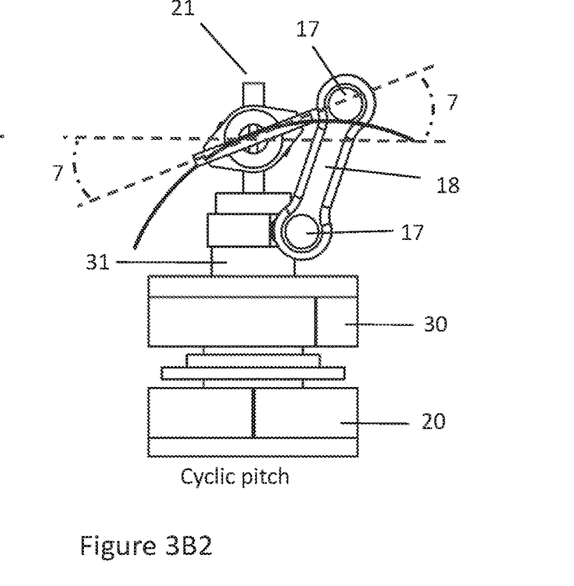

With reference to FIGS. 3b1 and 3b2, during operation, to provide a change in blade pitch angle 7 cyclically, the motor controller 33 instruct the motor 20, 30 to repeatedly provide the necessary alteration in relative angle between the respective motors 20, 30 in their rotational circle. A difference in angle between the motors 20, 30 rotates the rotor shaft 31 relative to the rotor shaft 21, and an alteration in relative angle between the motor 20, 30 will translate to a movement of the rotor blade 5a in the given direction. For example, the motor 30 is instructed to increase its angle relative to the motor 20 by a certain amount corresponding to instruction provided by the motor controller 33. This initiates a corresponding movement of the rotor shaft 31, rotating the rotor shaft 31 clockwise relative to the motor 20. Consequently, the ball joints 17 and pitch arm 18, follow the movement, tilting the connecting member 13 about the rotor arms of the center member 14, increasing the blade pitch angle 7 of the rotor blade 5a. Which again decreases the blade pitch angle 7 of the rotor blade 5b equally at the desired position during the rotor assembly's rotation. The difference in rotational position between motor 30 and motor 20 is reversed 180 degrees later in the rotors rotation, for then again being repeated after a full revolution of the rotor to give cyclic changes in rotor blade pitch.

Alternative Motor Design

Figure 4A:
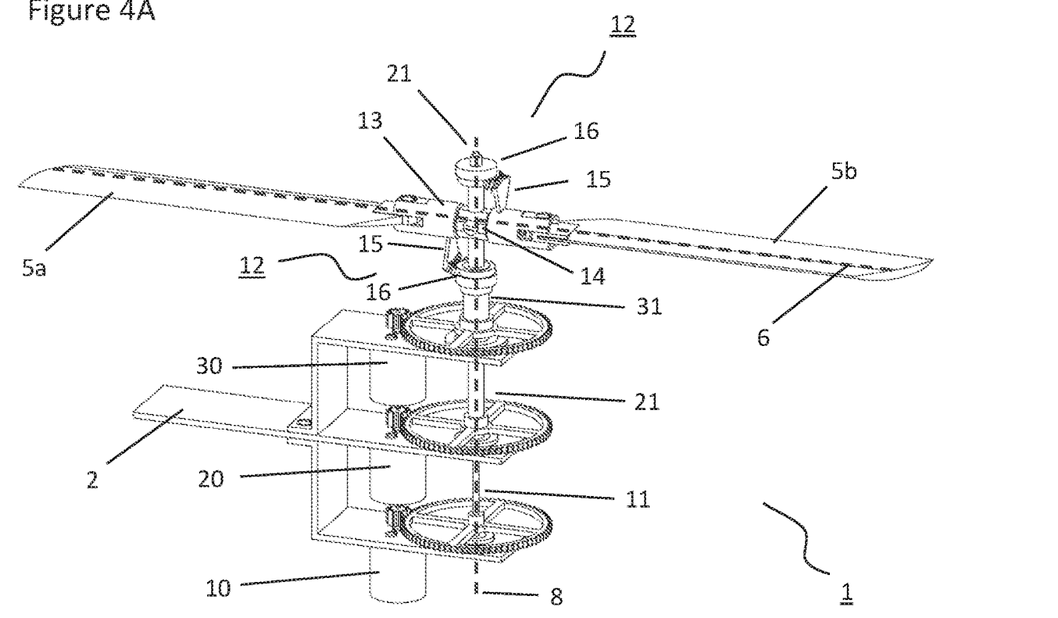
FIG. 4A illustrates an alternative rotor assembly according to a present embodiment utilizing a motor unit comprising a gear and a conventional electric motor seen from the side in a nominal position.
Figure 4B:
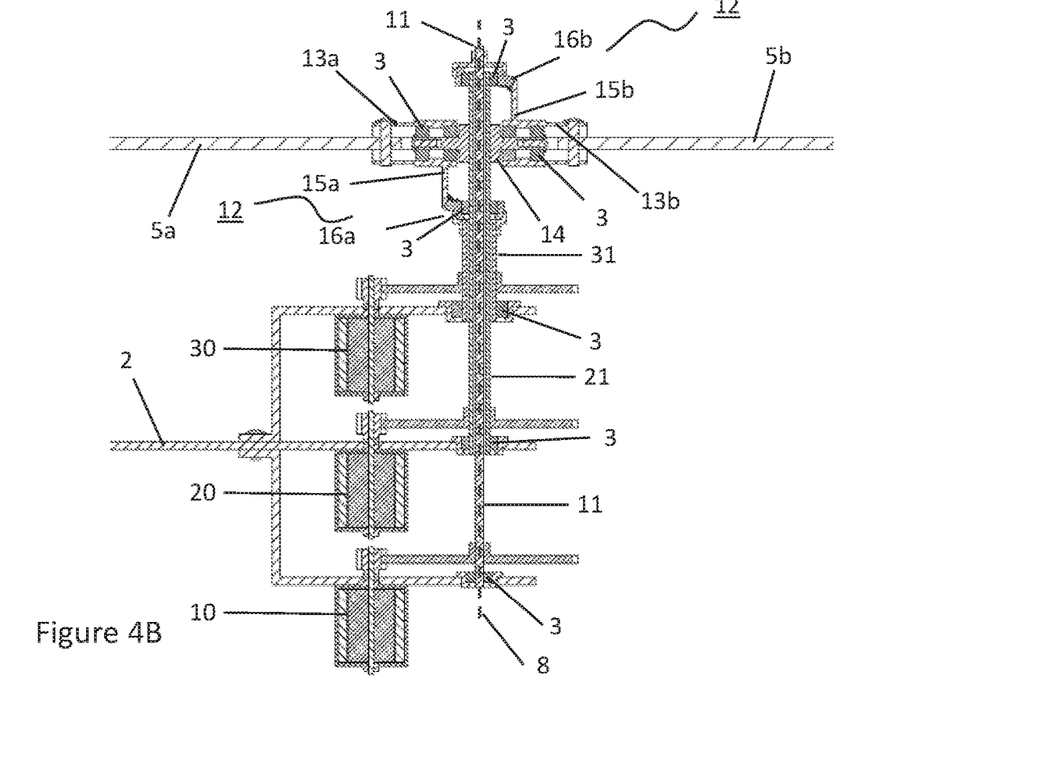
FIG. 4B illustrates an alternative rotor assembly according to a present embodiment utilizing a motor unit comprising a gear and a conventional electric motor seen in a cross section view.

Alternatively, the motors 10, 20, 30 of the present disclosure are not provided in a stacked coaxial fashion. With reference to FIG. 4, the rotor shafts 11, 21, 31 may still be positioned within one another, and be adjusted to transfer rotational input to rotate the rotor and alter the blade pitch angle 7 of the rotor assembly 1. However, the motors 10, 20, 30 may by moved out of their stacked orientation and be positioned at any suitable location provided the inclusion of an additional force transfer mechanisms comprised in or integrated with the respective motor unit. These additional force transfer mechanisms may for example be belt arrangements or gears as illustrated in FIGS. 4a and 4b, and be positioned and connected at and between the respective motor 10, 20, 30 and their respective rotor shaft 11, 21, 31. Making the respective rotor shaft 11, 21, 31 rotate with the respective motor 10, 20, 30. This also provides an additional point were the gear ratio of the assembly may be adjusted.

Therefore, provided the necessary adaptations to position and connect the motors to the vehicle is undertaken, the present disclosure may be adapted to function with any type of motor capable of the necessary control.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A thrust generating rotor assembly for a vehicle, the thrust generating rotor assembly comprising:
   a first rotor blade configured to rotate around a rotor shaft axis with a nominal first blade pitch angle and to pitch around a longitudinal rotor blade axis;
   first and second electric motor units configured to drive the thrust generating rotor assembly and having a first relative rotational angle, the first and second electric motor units respectively connected to concentrically oriented first and a second rotor shafts and able to rotate the first and second rotor shafts at least in a predefined first direction at respective first and second rotational speeds independent of each other around the rotor shaft axis, wherein the first rotor shaft runs through the center of the second rotor shaft;
   a pitch connection between the first and the second rotor shafts and the first rotor blade, configured to alter the first blade pitch angle in response to altering the first relative rotational angle of the motor units according to a predefined relation between the first relative rotational angle and the first blade pitch angle depending on a mechanical structure of the pitch connection; and
   a motor controller configured to control the first relative rotational angle and thereby control the first blade pitch angle of the first rotor blade at least when controlling the first and second motor units to rotate the first and second rotor shafts in the first direction.

2. A thrust generating rotor assembly according to claim 1, wherein the first relative rotational angle comprises the difference between a first rotational angle of the first motor unit relative to a first nominal angle and a second rotational angle of the second motor unit relative to a second nominal angle;
   wherein the thrust generating rotor assembly is operable to increase the first blade pitch angle from the nominal first blade pitch angle, and operable to decrease the first blade pitch angle from the nominal first blade pitch angle; and
   wherein the pitch connection is operable to increase the first blade pitch angle from the nominal first blade pitch angle, and operable to decrease the first blade pitch angle from the nominal first blade pitch angle.

3. A thrust generating rotor assembly according to claim 1, wherein the mechanical structure of the pitch connection includes a gear device comprising a blade gear part connected to the first rotor blade and a shaft gear part connected to the first or the second rotor shaft, and wherein the gear parts are engaged by respective gear teeth.

4. A thrust generating rotor assembly according to claim 3, wherein the blade gear part is connected to the first rotor blade perpendicularly to the longitudinal rotor blade axis of the rotor blade and the shaft gear part connected to the rotor shafts perpendicularly to the rotor shaft axis.

5. A thrust generating rotor assembly according to claim 3, wherein the blade gear part comprises a circular shape with a rotational axis coinciding with the longitudinal rotor blade axis of the rotor blade, and the shaft gear part comprises a circular shape with a rotational axis coinciding with the rotor shaft axis.

6. A thrust generating rotor assembly according to claim 1, wherein the pitch connection comprises a ball link unit.

7. A thrust generating rotor assembly according to claim 6, wherein the ball link unit comprises a pitch arm with a first end connected through a ball joint to the second shaft and a second end connected through a ball joint to the rotor blade.

8. A thrust generating rotor assembly according to claim 6, wherein the ball link unit comprises a pitch arm with a first end rotationally connected to the first or second rotor shaft, around an axis perpendicular to the rotor shaft axis, and a second end rotationally connected to the rotor blade, around an axis parallel to the longitudinal rotor blade axis.

9. A method for operating the thrust generating rotor assembly according to claim 1, the method comprising:
   receiving, by the motor controller, first and second rotational positions of the respective first and second electric motor units from a rotational sensor configured to measure at least the first and second rotational positions of the respective first and second electric motor units;
   determining the first relative rotational angle based, at least in part, on the first and second rotational positions of the respective first and second electric motor units; and
   controlling the first and/or second electric motor units to adjust the first relative rotational angle and the first blade pitch angle of the first rotor blade based, at least in part, on the first and second rotational positions of the respective first and second electric motor units.

10. A thrust generating rotor assembly for a vehicle, the thrust generating rotor assembly comprising:

a first rotor blade configured to rotate around a rotor shaft axis with a nominal first blade pitch angle and to pitch around a longitudinal rotor blade axis;

first and second electric motor units configured to drive the thrust generating rotor assembly and having a first relative rotational angle, the first and second electric motor units respectively connected to concentrically oriented first and a second rotor shafts able to rotate relative to each other around the rotor shaft axis, wherein the first rotor shaft runs through the center of the second rotor shaft;

a pitch connection between the first and the second rotor shafts and the first rotor blade, configured to alter the first blade pitch angle in response to altering the first relative rotational angle of the motor units according to a predefined relation between the first relative rotational angle and the first blade pitch angle; and a motor controller configured to control the first relative rotational angle and thereby control the first blade pitch angle of the first rotor blade;

a second rotor blade configured to rotate around the rotor shaft axis with a nominal second blade pitch angle and to pitch around the longitudinal rotor blade axis;

a third electric motor unit configured to drive the thrust generating rotor assembly and having a second relative rotational angle with respect to the second electric motor unit, the third electric motor unit connected to a concentrically oriented third rotor shaft able to rotate relative to the first and the second rotor shafts, wherein the second rotor shaft runs through the center of the third rotor shaft; and a second pitch connection between the third rotor shaft and the second rotor blade, configured to alter the second blade pitch angle in response to altering the second relative rotational angle of the second and third motor units according to a predefined relation between the second relative rotational angle and the second blade pitch angle depending on a second mechanical structure of the second pitch connection;

wherein the motor controller is configured to control the second relative rotational angle and thereby control the second blade pitch angle of the second rotor blade.

11. A method for operating the thrust generating rotor assembly according to claim 10, the method comprising:

receiving, by the motor controller, first, second, and/or third rotational positions of the respective first, second, and/or third electric motor units from at least one rotational sensor configured to measure the first, second, and/or third rotational positions of the respective first, second, and/or third electric motor units;

determining the first and/or second relative rotational angle based, at least in part, on the first, second, and/or third rotational positions of the respective first, second, and/or third electric motor units; and controlling the first, second, and/or third electric motor units to adjust the first and/or second relative rotational angle and the first and/or second blade pitch angle of the respective first and/or second rotor blade based, at least in part, on the first, second and/or third rotational positions of the respective first, second, and/or third electric motor units.

12. A method of operating a thrust generating rotor assembly for a vehicle, the method comprising:

receiving first and second rotational positions of respective first and second electric motor units of the thrust generating rotor assembly, wherein the first and second electric motor units are respectively connected to concentrically oriented first and a second rotor shafts and able to rotate the first and second rotor shafts at least in a predefined first direction at respective first and second rotational speeds independent of each other around a rotor shaft axis of the thrust generating rotor assembly;

determining a first relative rotational angle between the first and second electric motor units based, at least in part, on the first and second rotational positions of the respective first and second electric motor units; and controlling the first and/or second electric motor units to adjust the first relative rotational angle and thereby adjust a first blade pitch angle of a first rotor blade of the thrust generating rotor assembly when controlling the first and second motor units to rotate the first and second rotor shafts in the first direction, wherein the thrust generating rotor assembly further comprises:

a pitch connection between the first and the second rotor shafts and the first rotor blade, configured to alter the first blade pitch angle in response to altering the first relative rotational angle of the motor units according to a predefined relation between the first relative rotational angle and the first blade pitch angle depending on a mechanical structure of the pitch connection.

13. The method of claim 12, wherein the first relative rotational angle comprises the difference between a first rotational angle of the first motor unit relative to a first nominal angle and a second rotational angle of the second motor unit relative to a second nominal angle;

wherein the receiving of the first and second rotational positions, the determining of the first relative rotation angle, and the controlling of the first and/or second electric motor units to adjust the first relative rotational angle and thereby adjust the first blade pitch angle, are performed at least three times to adjust the first blade pitch angle to respective three different values.

14. The method of claim 12, wherein the mechanical structure of the pitch connection includes a gear device comprising a blade gear part connected to the first rotor blade and a shaft gear part connected to the first or the second rotor shaft, and wherein the gear parts are engaged by respective gear teeth.

15. The method of claim 14, wherein the blade gear part is connected to the first rotor blade perpendicularly to the longitudinal rotor blade axis of the rotor blade and the shaft gear part connected to the rotor shafts perpendicularly to the rotor shaft axis.

16. The method of claim 14, wherein the blade gear part comprises a circular shape with a rotational axis coinciding with the longitudinal rotor blade axis of the rotor blade, and the shaft gear part comprises a circular shape with a rotational axis coinciding with the rotor shaft axis.

17. The method of claim 12, wherein the pitch connection comprises a ball link unit.

18. The method of claim 17, wherein the ball link unit comprises a pitch arm with a first end connected through a ball joint to the second shaft and the second end connected through a ball joint to the rotor blade.

19. The method of claim 17, wherein the ball link unit comprises a pitch arm with a first end rotationally connected to the first or second rotor shaft, around an axis perpendicular to the rotor shaft axis, and a second end rotationally connected to the rotor blade, around an axis parallel to the longitudinal rotor blade axis.

20. The method of claim 12, further comprising:
receiving flight command input from a pilot or an autopilot to maneuver the vehicle along a predefined or manually updated route;
determining an updated first relative rotational angle corresponding to the received flight command input; and
controlling the first and/or second electric motor units to further adjust the first relative rotational angle according to the updated first relative rotational angle and thereby further adjust the first blade pitch angle of the first rotor blade to maneuver the vehicle along the predefined or manually updated route.

* * * * *